United States Patent [19]

Morinouchi et al.

[11] Patent Number: 4,782,455
[45] Date of Patent: Nov. 1, 1988

[54] CARD SPEED DETERMINATION IN A CARD READER

[75] Inventors: Kinya Morinouchi, Kashihara; Shigeru Kitano, Nara, both of Japan

[73] Assignee: Sharp Kabushiki Kaisha, Osaka, Japan

[21] Appl. No.: 51,171

[22] Filed: May 18, 1987

Related U.S. Application Data

[63] Continuation of Ser. No. 697,034, Jan. 31, 1985, abandoned.

[30] Foreign Application Priority Data

Feb. 2, 1984 [JP] Japan .................................. 59-18966
Feb. 3, 1984 [JP] Japan .................................. 59-19223

[51] Int. Cl.⁴ ........................ G06F 15/02; G06K 5/00
[52] U.S. Cl. ........................... 364/569; 73/488; 235/380; 235/384; 235/474; 235/476; 324/160; 364/565
[58] Field of Search ............... 364/500, 565, 509, 700, 364/706, 709; 324/161, 160; 73/488, 527, 529; 235/379–381, 384, 449, 474–476, 479, 493

[56] References Cited

U.S. PATENT DOCUMENTS

| | | | |
|---|---|---|---|
| 4,036,430 | 7/1977 | Eppich | 235/482 |
| 4,055,747 | 10/1977 | Jensen | 235/474 |
| 4,104,682 | 8/1978 | Lehner et al. | 235/449 |
| 4,146,922 | 3/1979 | Brown et al. | 364/565 |
| 4,166,976 | 9/1979 | Ruhnau et al. | 364/565 |
| 4,176,783 | 12/1979 | Eppich | 235/474 |
| 4,181,920 | 1/1980 | Cerekas | 235/449 |
| 4,238,835 | 12/1986 | Fujii et al. | 364/500 |
| 4,358,103 | 11/1982 | Koike et al. | 235/449 |
| 4,367,051 | 1/1983 | Inoue | 364/569 |
| 4,377,828 | 3/1983 | Hayman et al. | 235/475 |
| 4,394,568 | 7/1983 | Nakatsu | 235/475 |
| 4,486,653 | 12/1984 | Powell | 235/474 |
| 4,551,813 | 11/1985 | Sanbayashi et al. | 364/569 |

Primary Examiner—Parshotam S. Lall
Assistant Examiner—Kevin J. Teska
Attorney, Agent, or Firm—Birch, Stewart, Kolasch, & Birch

[57] ABSTRACT

A card reader control system includes a measuring device which measures a time interval of a clock signal which is developed from a card reader when a card is manually driven to travel in the card reader. The card reader control system stores the maximum time interval and the minimum time interval of the clock signal measured by the measuring device. When either one or both of the maximum time interval and the minimum time interval is not included in a preferred range, an alarm buzzer is enabled to indicate that the card speed is not suited for the reading operation.

7 Claims, 4 Drawing Sheets

CARD SPEED DETERMINATION IN A CARD READER

This application is a continuation of application Ser. No. 697,034, filed on Jan. 31, 1985, now abandoned.

BACKGROUND OF THE INVENTION

1. Field of the Invention

The present invention relates to a card reader control system and, more particularly, to a card speed determination system in a manual card reader wherein a card such as a magnetic card is manually driven to travel in a card reader.

2. Description of the Prior Art

Generally, a card travelling speed influences on the accuracy of the reading operation in a card reader system. For example, in a manual magnetic card reader, a magnetic card is manually driven to travel in the card reader. Therefore, the card travelling speed is variable. When the card is driven to travel at a considerably high speed, the reader system can not follow the travelling speed of the card so that an erroneous reading operation (vertical and/or horizontal parity check error) occurs. When the card is manually driven to travel at a considerably low speed, the reading signal can not be easily obtained.

Therefore, especially in a magnetic card reader, the magnetic card must be driven to travel at a speed falling in a predetermined range. In the conventional system, when a card reading error is detected, the application program can detect the error contents. However, it is not determinative whether the reading error is caused by an abnormal card travelling speed or by other reasons where the card is driven to travel at a preferred speed.

OBJECTS AND SUMMARY OF THE INVENTION

Objects of the Invention

Accordingly, an object of the present invention is to provide a novel manual card reader system which is effective to ensure an accurate reading operation.

Another object of the present invention is to provide an alarm system in a manual card reader system which develops an alarm output if a card is manually driven to travel at an undesirable speed.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

To achieve the above objects, pursuant to an embodiment of the present invention, a measuring device is provided in order to measure an interval of clock signals obtained from a card reader when a card is manually driven to travel in the card reader. The measured interval of clock signals is temporarily stored in a memory device, and a determination system detects whether the measured interval is included in a predetermined range which is suited for an accurate reading operation. If an affirmative answer is not obtained at the determination system, an alarm device is enabled to indicate an abnormal card speed.

In another preferred form, the measured maximum interval and the measured minimum interval are stored in a storage system, and the maximum and minimum intervals are displayed on a display device to inform the operator of the card travelling condition.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
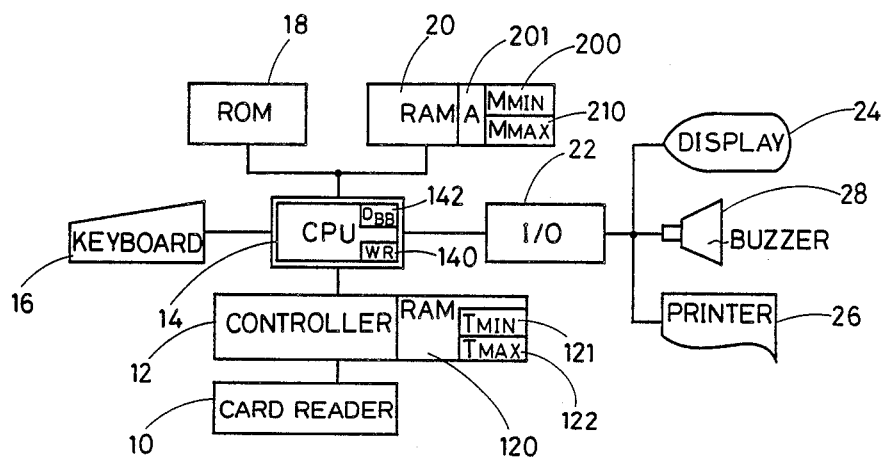
FIG. 1 is a block diagram of an embodiment of a card reader system of the present invention.

A card reader control system of the present invention includes, as shown in FIG. 1, a magnetic card reader 10, a reader controller 12 for controlling the operation of the magnetic card reader 10, a main CPU 14, and a keyboard 16. A read only memory (ROM) 18 and a random access memory (RAM) 20 are connected to the main CPU 14. An input/output interface 22 is connected to the main CPU 14, to which a display unit 24, a printer unit 26, and an alarm buzzer 28 are connected.

The random access memory 20 includes preset memory areas 200 ($M_{MIN}$) and 210 ($M_{MAX}$). The preset memory areas 200 ($M_{MIN}$) and 210 ($M_{MAX}$) store the lowest limit and the highest limit of a preferred card travelling speed, respectively, which are preset through the keyboard 16. The preset operation will be described later. The reader controller 12 includes an internal RAM 120 which has memory areas 121 ($T_{MIN}$) and 122 ($T_{MAX}$). The memory areas 121 ($T_{MIN}$) and 122 ($T_{MAX}$) store the minimum time interval and the maximum time interval measured by a timer system, respectively. The measuring operation will be described later. If the reader controller 12 is omitted, the internal RAM 120 should be included in the RAM 20.

Figure 3:
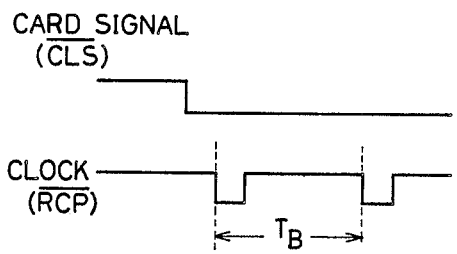
FIG. 3 is a time chart for explaining the main operational mode of FIG. 2.

A main flow of an operation of the card reader control system of FIG. 1 will be described with reference to FIG. 2. Before conducting an actual operation, the maximum value and the minimum value related to a preferred card travelling speed should be preset in the preset memory areas 210 ($M_{MAX}$) and 200 ($M_{MIN}$), respectively, with reference to an operator manual. More specifically, the minimum value related to the highest limit of the preferred card travelling speed is preset in the memory area 200 ($M_{MIN}$) through the use of the keyboard 16. The maximum value related to the lowest limit of the preferred card travelling speed is preset in the preset memory area 210 ($M_{MAX}$) through the use of the keyboard 16. The minimum value and the maximum value relate to a time interval $T_B$ of a clock signal $\overline{RCP}$ which is obtained when the actual reading operation is conducted. The minimum value represents the minimum time interval $T_B$ of the clock signal $\overline{RCP}$ (see FIG. 3) when the card is driven to travel at the highest limit of the preferred card travelling speed range. The maximum value represents the maximum time interval $T_B$ of the clock signal $\overline{RCP}$ when the card is driven to travel at the lowest limit of the preferred card travelling speed range. The minimum and maximum values are represented by a one byte data, respectively, in the hexadecimal notation (steps n1 and n2 in FIG. 2).

Figure 2:
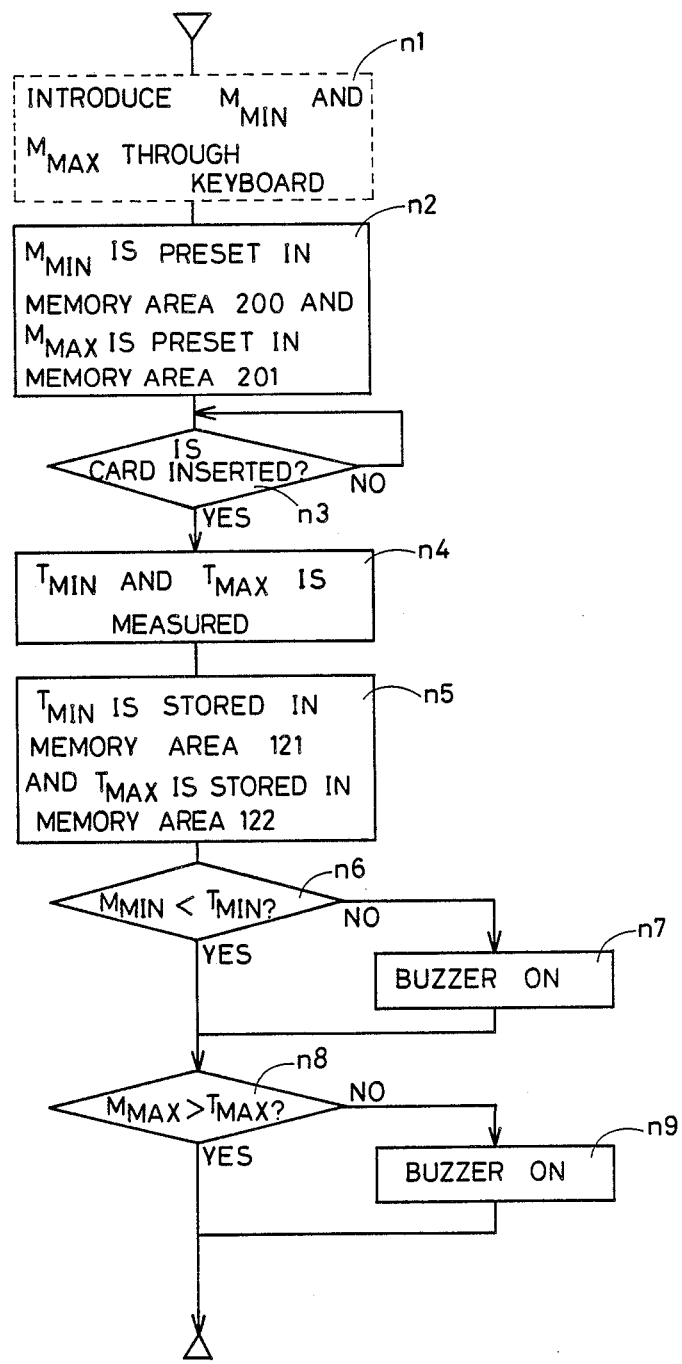
FIG. 2 is a flow chart for explaining a main operational mode of the card reader system of FIG. 1.

When a magnetic card is manually inserted into the magnetic card reader 10 and is manually driven to travel along the reader head, the clock signal $\overline{RCP}$ is developed and the measuring operation of the clock pulse interval ($T_{MIN}$ and $T_{MAX}$) is conducted (steps n3, n4 and n5 in FIG. 2). The time interval measuring operation will be described in detail with reference to FIG. 4.

First, the initializing operation is conducted to the memory areas 121 ($T_{MIN}$) and 122 ($T_{MAX}$). More specifically, an initial data "FF" in the hexadecimal notation is set in the memory area 121 ($T_{MIN}$), and an initial data "00" in the hexadecimal notation is set in the memory area 122 ($T_{MAX}$) of the internal RAM 120 included in the reader controller 12 (step n11 in FIG. 4). When the magnetic card is manually inserted into the magnetic card reader 10, the card insertion is detected in a conventional manner, and the magnetic card reader 10 develops a card insertion signal $\overline{CLS}$ (Logic "L" as shown in FIG. 5) (step n3 in FIG. 2). When the control system detects the "L" level of the card insertion signal $\overline{CLS}$ (step n12 in FIG. 4), the actual reading operation is conducted. In response to the manual driving of the magnetic card in the magnetic card reader 10, the clock signal $\overline{RCP}$ is developed from the magnetic card reader 10. The clock signal $\overline{RCP}$ is produced by reading a synchronization signal track recorded on the magnetic card, or by utilizing a self-clock system responding to the read out information. The period of the clock signal $\overline{RCP}$ represents the card travelling speed. When the logic "L" of the clock signal $\overline{RCP}$ is detected (step n13 in FIG. 4), a timer count operation is initiated (step n14 in FIG. 4). When the next trailing edge of the clock signal $\overline{RCP}$ is detected (step n15 in FIG. 4), the timer count operation is terminated (step n16 in FIG. 4), and the count value T is temporarily stored in a working register 140 (WR) included in the main CPU 14 (step n17 in FIG. 4). Further, the timer count operation is again started (step n18 in FIG. 4) to count the next period of the clock signal $\overline{RCP}$.

Figure 4:
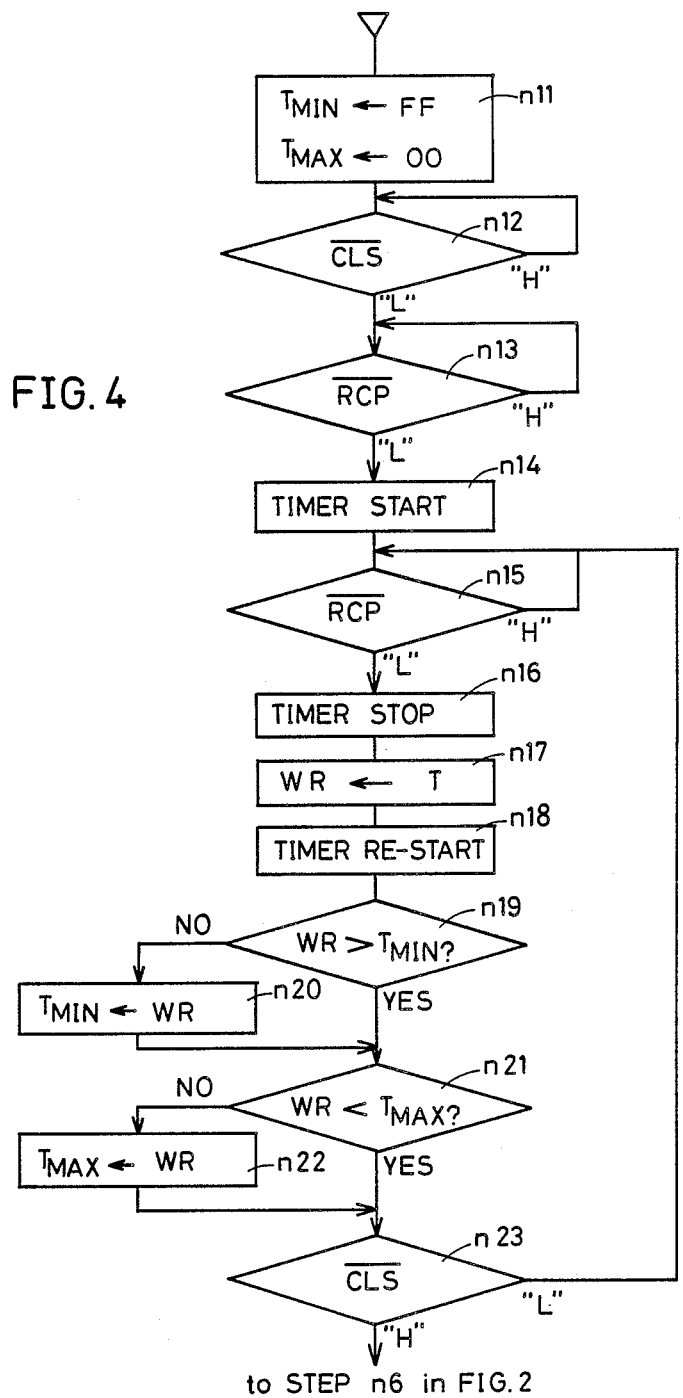
FIG. 4 is a flow chart for explaining a card speed measuring and memorizing operational mode of the card reader system of FIG. 1.
Figure 5:
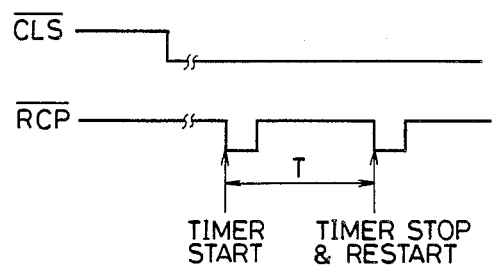
FIG. 5 is a time chart for explaining the card speed measuring and memorizing operational mode of FIG. 4.

The timer count value T temporarily stored in the working register 140 (WR) is compared with the contents $T_{MIN}$ stored in the memory area 121 ($T_{MIN}$) of the RAM 120 included in the reader controller 12 (step n19 in FIG. 4). If the relation WR (timer count value T) > $T_{MIN}$ is not satisfied, the contents WR temporarily stored in the working register 140 (WR) is written into the memory area 121 ($T_{MIN}$) (step n20 in FIG. 4) so as to update the contents stored in the memory area 121 ($T_{MIN}$). Further, the timer count value T temporarily stored in the working register 140 (WR) is compared with the contents $T_{MAX}$ stored in the memory area 122 ($T_{MAX}$) of the internal RAM 120 (step n21 in FIG. 4). If the relation WR < $T_{MAX}$ is not satisfied, the contents WR temporarily stored in the working register 140 (WR) are written into the memory area 122 ($T_{MAX}$) (step n22 in FIG. 4) so as to update the contents stored in the memory area 122 ($T_{MAX}$). The period measuring operation is repeated until the card insertion signal $\overline{CLS}$ bears the logic "H" (step n23 in FIG. 4). When the card insertion signal $\overline{CLS}$ changes to the logic "H", the card reading operation is terminated, and the operation is returned to the step n6 in FIG. 2.

With this measuring operation, the memory area 121 ($T_{MIN}$) stores the timer count value T related to the highest speed of the manual card travelling in the hexadecimal notation. The memory area 122 ($T_{MAX}$) stores the timer count T related to the lowest speed of the manual card travelling in the hexadecimal notation.

The thus stored minimum time interval $T_{MIN}$ is compared with the preset value $M_{MIN}$ stored in the preset memory area 200 ($M_{MIN}$) (step n6 in FIG. 2). If the relation $M_{MIN} < T_{MIN}$ is not satisfied, the alarm buzzer 28 is enabled to indicate that the card travelling speed is higher than the highest limit of the preferred card travelling speed range (step n7 in FIG. 2). Further, the measured maximum time interval $T_{MAX}$ is compared with the preset value $M_{MAX}$ stored in the preset memory 210 ($M_{MAX}$) (step n8 in FIG. 2). If the relation $M_{MAX} > T_{MAX}$ is not satisfied, the alarm buzzer 28 is enabled (step n9 in FIG. 2) to indicate that the card travelling speed is lower than the lowest limit of the preferred card speed range. In a preferred form, the buzzer sound should be different from that is produced when the card travelling speed is higher than the highest limit of the preferred card speed range.

Figure 6:
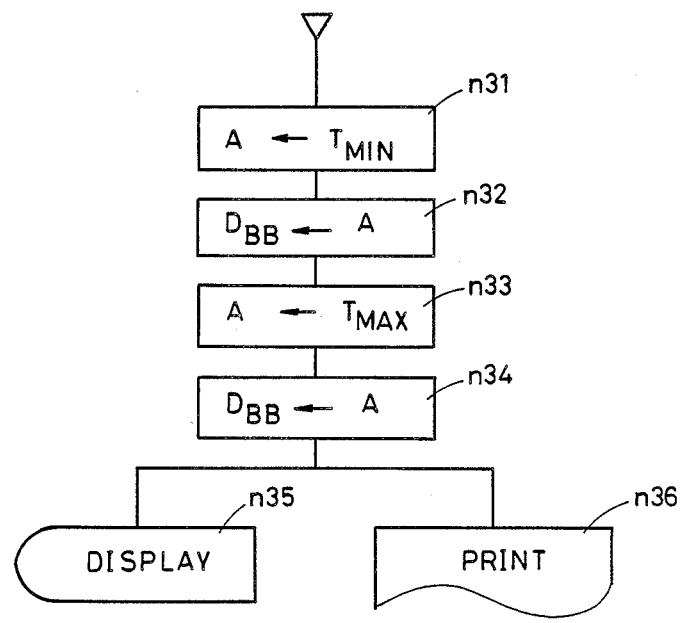
FIG. 6 is a flow chart for explaining a reading operation of a measured card speed which is stored in a memory device.

The measured minimum time interval $T_{MIN}$ stored in the memory area 121 ($T_{MIN}$) and the measured maximum time interval $T_{MAX}$ stored in the memory area 122 ($T_{MAX}$) can be read out in accordance with the application program shown in FIG. 6. When a read instruction is introduced from the keyboard 16, the contents $T_{MIN}$ stored in the memory area 121 ($T_{MIN}$) is transferred to a temporary memory section 201 (A) included in the RAM 20. The thus transferred contents $T_{MIN}$ is further transferred to a display buffer 142 ($D_{BB}$) included in the main CPU 14 (steps n31 and n32 in FIG. 6). On the other hand, the contents $T_{MAX}$ stored in the memory area 122 ($T_{MAX}$) is transferred to the temporary memory section 201 (A) (step n33 in FIG. 6), and then to the display buffer 142 ($D_{BB}$) included in the main CPU 14 (step n34 in FIG. 6). The minimum time interval $T_{MIN}$ and the maximum time interval $T_{MAX}$ stored in the display buffer 142 ($D_{BB}$) are displayed on the display unit 26 (step n35 in FIG. 6), and printed out by the printer unit 26 (step n36 in FIG. 6).

The time intervals $T_{MIN}$ and $T_{MAX}$ are count numbers stored in the timer system. Therefore, the actual time period TB of one cycle of the clock signal $\overline{RCP}$ can be represented as follows.

$$TB_{MIN(MAX)} = T_{MIN(MAX)} \times \text{(one count time period)}$$

The invention being thus described, it will be obvious that the same may be varied in many ways without departure from the spirit and scope of the invention, which is limited only by the following claims.

What is claimed is:

1. A card reader control system for a card reader wherein a card is manually driven to travel through a card reader, said card reader control system comprising:

a card reader for reading information stored on said card and for generating a clock signal in response to occurrence of said information on said card;

measuring means for measuring time intervals of said clock signal generated by said card reader when the card is manually driven to travel in said card reader;

first storing means for storing said time intervals of said clock signal measured by said measuring means, said storing means further storing a first maximum time interval and a first minimum time interval at least before said card travels in said card reader;

second storing means for storing predetermined time intervals, a second maximum time interval and a second minimum time interval;

a working register operatively connected to said first storing means and said second storing means for temporarily storing said time intervals measured by said measuring means;

determination means for determining card speed by comparing the time intervals measured by said measuring means with said predetermined time intervals stored in said second storing means, said determination means further comparing each of said time intervals temporarily stored in said working register with each of first maximum and first minimum time intervals stored in said first storing means, said determination means updating said first maximum time interval by each of said time intervals temporarily stored in said working register which is greater than said first maximum time interval, said determination means also updating said first minimum time interval by each of said time intervals temporarily stored in said working register which is less than said first minimum time interval, and said determination means comparing the first and second minimum time intervals and the first and second maximum time intervals stored in the respective first and second storing means for determining a minimum and a maximum card speed, said determination means being programmable by computer software; and alarm means for generating an alarm signal when said determination means determines said card speed fails to be within a preferred range, said preferred range being between said second maximum time interval and said second minimum time interval.

2. The card reader control system of claim 1, wherein said storing means stores a maximum time interval and a minimum time interval of said clock signal.

3. The card reader control system of claim 1, further comprising preset means for presetting said preferred range in a preset memory.

4. The card reader control system of claim 1, wherein said alarm means includes a buzzer.

5. The card reader control system of claim 1, further comprising:

read-out means for reading out said time interval of said clock signal stored in said storing means; and display means for displaying said time interval of said clock signal read out by said read-out means.

6. The card reader control system as recited in claim 1, further comprising a keyboard operatively connected to the first and second storing means for presetting said first maximum and minimum time intervals and said second maximum and minimum time intervals.

7. The card reader control system as recited in claim 1, wherein said alarm means further comprises a display means for displaying the first maximum and minimum time intervals

* * * * *